United States Patent [19]

Young

[11] 4,184,906
[45] Jan. 22, 1980

[54] METHOD OF MAKING ASBESTOS-CEMENT LAMINATES

[75] Inventor: Jason C. Young, Lynfield, New Zealand

[73] Assignee: James Hardie & Coy Pty. Limited, Sydney, Australia

[21] Appl. No.: 901,364

[22] Filed: Apr. 28, 1978

[30] Foreign Application Priority Data

May 3, 1977 [AU] Australia .............................. PC9961

[51] Int. Cl.² .......................................... B32B 31/00
[52] U.S. Cl. .................................. 156/299; 52/309.3; 52/309.17; 52/384; 52/746; 52/785; 156/89; 156/309; 156/334; 162/124; 162/154; 428/77; 428/523; 428/539
[58] Field of Search ................. 156/89, 309, 299, 334, 156/41, 42; 264/60; 428/77, 539, 523; 52/309.3, 384, 309.17, 746, 785; 162/124, 154

[56] References Cited

U.S. PATENT DOCUMENTS

| | | | |
|---|---|---|---|
| 1,939,815 | 12/1933 | Hopkins et al. | 52/746 |
| 2,495,043 | 1/1950 | Willey et al. | 156/306 |
| 2,669,166 | 2/1954 | Smith | 162/124 |
| 3,084,089 | 4/1963 | Morgan et al. | 156/334 |
| 3,592,724 | 7/1971 | King et al. | 428/539 |
| 3,695,960 | 10/1972 | Richter | 156/89 |

Primary Examiner—John T. Goolkasian
Assistant Examiner—J. J. Gallagher
Attorney, Agent, or Firm—Geoffrey R. Myers

[57] ABSTRACT

Laminated slabs superficially bonded together are prepared by autoclaving a vertically compressed stack including a plurality of the sheets when initially set but not finally cured and having a polyethylene or like plastic film-like layer sandwiched between each pair of the sheet surfaces to be bonded together. A layer of material other than asbestos-cement may be sandwiched between the asbestos-cement sheets, for example, metal foil, to make the slab moisture-impervious or an array of filaments or wire-mesh material as reinforcement may be used.

12 Claims, 5 Drawing Figures

METHOD OF MAKING ASBESTOS-CEMENT LAMINATES

It is commonplace to make laminated slabs of asbestos-cement by facially adhering together a plurality of sheets of that material. The usual way of making such a laminate slab is simply to coat the surfaces of the constituent sheets to be united, with an adhesive and then build any required plurality of the sheets into a stack which is allowed to stand until such time as the adhesive is cured.

The indicated prior method of manufacturing asbestos-cement laminate slabs is not entirely satisfactory because it is time-consuming; the asbestos-cement sheets have themselves to be fully cured before the adhesion and laminating action can begin; moreover, there is difficulty in ensuring that the adhesive, usually applied as a liquid, is uniformly and totally distributed.

The main object of the present invention is to overcome the indicated disabilities in a very simple way by a method of making asbestos-cement laminate slabs in which provision for adhesion and the entire necessities for lamination may be performed during, and as part of, the process of curing the individual asbestos-cement sheets themselves. By the present method, use of an adhesive, as such, is dispensed with and replaced by an inexpensive solid plastics film which, under the conditions of asbestos-cement curing, becomes an effective bonding agent for the asbestos-cement sheets. Moreover, the bonding medium employed is easily spread on one of the sheets as a pliant, continuous, unbroken layer which, in the finished slab establishes one or more substantially moisture impervious barrier layers between the constituent sheets.

Another object of the invention is to provide a method of making an asbestos-cement laminate slab, as discussed above, which includes a layer of what may be called alien or special-purpose material, being a material other than asbestos-cement, to endow the laminated slab with a specific property.

For example, as already stated above, laminate slabs according hereto are substantially moisture impervious by reason of the inclusion therein of a bonding film. Where however, absolute moisture imperviousness is required the laminate may have sandwiched within it an alien layer of metal foil, preferably aluminium foil; our experiments having shown that by the method of the present invention the presence of the alien material between two sheets of asbestos-cement does not impair the effectiveness with which those sheets become joined together notwithstanding the impervious nature of the alien layer.

By way of further example, our experiments have also shown that a laminate slab may include an alien layer to give it strength by way of reinforcement or as a means whereby, in the event of slab breakage, the broken fragments will not fall apart. Such an alien layer may consist of an array of parallel or crossing filaments of metal, glass, fibre or other reinforcing material, or a layer of wire mesh material, so-called expanded sheet metal or multi-apertured sheet metal.

In the ordinary production of asbestos-cement sheets it is customary to accelerate curing of the sheets by autoclaving. This is a high pressure steam curing, and one of the time and labour saving aspects of the present invention resides in the fact that according hereto adhesive bonding of a plurality of sheets to form a laminate slab is performed entirely while the sheets are undergoing autoclave curing.

The invention provides a method of producing a laminate slab consisting of a plurality of cured asbestos-cement sheets facially joined together, comprising the steps of:

(a) forming a stack of initially set but incompletely cured ("green") asbestos-cement sheets with at least one film of solid, pliant, bonding material sandwiched between two sheet surfaces to be joined;

(b) arranging said stack within an autoclave vessel and subjecting the stack within the autoclave to steam under pressure sufficient to complete curing of the asbestos-cement sheets; and (c) during curing within the autoclave vessel, applying a compressive loading to said stack imposed on it in the direction normal to said film of bonding material.

When the cured stacks are removed from the autoclave it is found that the substance of the bonding film or films has to some extent migrated into the substance of the sheets and bonded them together with sufficient tenacity as to withstand peeling or separation of the sheets under all normal usage, and this with substantial imperviousness to penetration through the laminate of liquids.

In carrying the invention into practical effect, the bonding material is preferably polyethylene which, in the case where two asbestos-cement sheets are joined together without any alien layer therebetween, may be of a film thickness running from 0.001" to 0.012" with a preferred thickness of 0.006". This latter is a film thickness which appears to be in the nature of an optimum thickness in that it is not too flimsy for effective spreading of the film between the asbestos-cement sheets and it is not of such thickness as will cause likelihood of excess liquid bonding material spilling out from between the asbestos-cement sheets.

Experiment has shown, however, that the thickness of the polyethylene film is not critical as even somewhat beyond the stated range of thicknesses it will give an effective result. Experiment has also shown that similar films of polypropylene or poly-vinyl chloride may be used but they are less preferred as being somewhat more expensive.

The asbestos-cement sheets to be facially joined together are preferably assembled in a known type of box-form jig which is suitable for subsequent placement in the autoclave vessel. The jig serves to locate and hold the sheets in position during the autoclaving process. The first asbestos-cement sheet is laid on the flat floor of the jig in horizontal disposition. A bonding material film is then laid over the first sheet and the next asbestos-cement sheet then laid on top of the bonding film. This stack building process may be repeated with any number of sheets and interleaved bonding films until the desired finished slab thickness is built up. The total stack under treatment may be of any height which can be accommodated by the autoclave vessel, individual laminate slabs being readily separable after treatment simply by omission of a bonding material film between each slab of required thickness and it neighbours. Where a number of slabs are simultaneously formed in a single stack as just described, all of these slabs, except a few at the top of the stack, will be sufficiently compressively loaded during the autoclaving treatment merely by reason of the weight of the matters above them. To ensure that the top few slabs are also sufficiently loaded, a sheet of metal or a number of weights may be applied directly thereto. Alternatively, a few green asbestos-cement sheets which require curing but are not required to become laminates may be placed at the top of the stack. Any of these expedients will ensure good flat contact being made between the film layers and the asbestos-cement sheets being laminated within the stack.

The period of autoclaving may vary from six to twelve hours with a corresponding saturated steam pressure which is preferably in the range of 140 to 125 lbs. per square inch.

Experiment has shown that under the heat of autoclaving, especially where the surfaces to be bonded together are not absolutely flat, there is a danger of the bonding material layers shrinking and therefore incompletely fulfilling the function required of them. This difficulty is overcome, however, by relatively light, non-critical compressure loading of the stack as discussed above.

It will be understood that the curing temperature must be such as to liquefy the bonding material films or at least sufficient to render those films tacky and hence sufficiently fluid for penetration into the pores of the asbestos-cement sheets. We have found that the autoclave temperature may run from as little as 110° to as much as 250° C. This corresponds to an autoclave steam pressure range of from 21 lb to 570 lb per square inch, thus the preferred range of steam pressures previously mentioned herein (125 to 140 lbs per square inch) will suffice to ensure effective functioning on the part of the bonding material films.

Examples of the invention are shown in the drawings herewith.

Figure 1:
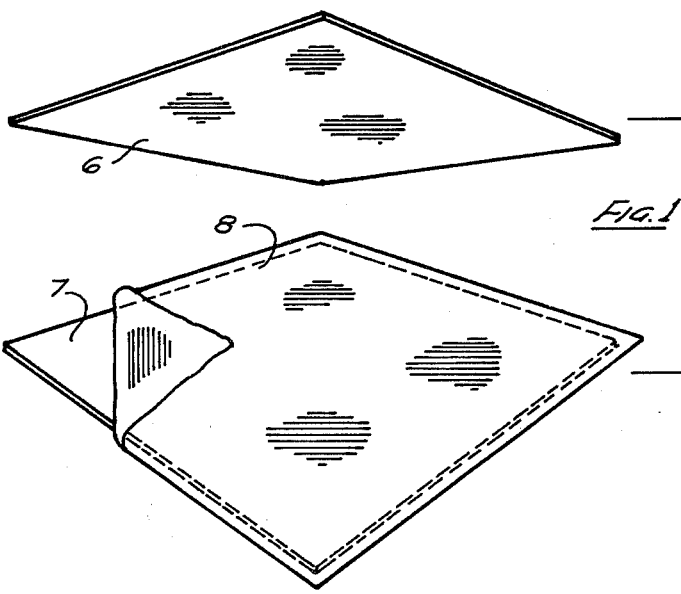
FIG. 1 is a perspective view of two asbestos-cement sheets to be laminated together by use of a film of bonding material being laid on the lower of the two sheets.

Referring to FIGS. 1 and 2, the lower sheet of the two (6 and 7) has a bonding film 8 laid over it and the sheets brought together so that after autoclaving as described above they become unitary as shown in FIG. 2. It will be noted that the overall dimensions of the bonding film 8 are a little greater than those of the sheets 6 and 7. This provision is optional, but preferable so that total coverage of sheet 7 by the layer 8 will be more easily accomplished without criticality in the placement of the layer on the sheet 7.

Figure 2:
FIG. 2 is an end view of the sheets shown in FIG. 1 when facially joined together.

It will be understood that the invention is applicable to the production of ordinary laminates, of the kind shown in FIG. 2, in which the individual asbestos-cement sheets and the bonding films extend throughout the lateral dimensions of the finished slab. Alternatively, various fluted or other ornamental effects may be achieved by use of the invention.

Figure 3:

FIG. 3 shows a laminate slab which is fluted on one side by consisting of a single asbestos-cement base sheet 9 and a plurality of strip-like asbestos-cement sheets 10 bonded to one side of it.

Figure 4:
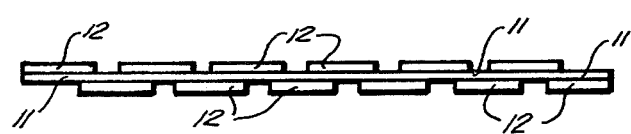

FIG. 4 shows a laminate slab fluted on both sides in consisting of a single asbestos-cement base sheet 11 having a plurality of strip-like asbestos-cement sheets 12 bonded to both sides of it.

Figure 5:

FIG. 5 shows a laminate slab, fluted on both sides, consisting entirely of strip-like asbestos-cement sheets 13 bonded together along mutually lapping edge margins as shown.

Other ornamental effects which may be easily realised in terms of the present invention will readily come to mind. For example, a base sheet of asbestos-cement may have a multiplicity of annular, diamond-shaped, circular, or otherwise shaped patch-like pieces of asbestos-cement applied and bonded to it on either or both sides.

Where the laminate slab is of the kind shown in FIGS. 1 and 2 except for having an alien layer included in it, and the alien layer is moisture impervious (such as aluminium foil) it is essential that the layer be sandwiched between two films of bonding material, and experiment has shown, somewhat surprisingly, that each of these bonding films is preferably a little thicker than those not having an alien layer sheet as described above. With an alien layer of aluminium foil, our tests have shown that the desirable thickness of each of the bonding material films runs from 0.005" to 0.015".

Where the slab includes one or more alien layers of ferrous material such as parallel or crossing filaments or wire mesh material, it is desirable, but not essential, for the alien layer to be sandwiched between two films of bonding material. Again, the thickness of each of these films (or the single film if only one is used) is preferably somewhat greater than the film thicknesses referred to above. The desirability in this connection is that when the bonding film or films soften, there will be a sufficient quantity of the fluid film material substantially to fill the spaces between the filaments or mesh-wires of the alien layer. In a trial practising of this form of the invention it was found that successful bonding of the asbestos-cement sheets was achieved when an alien layer of 22 gauge ¼" weld-mesh was sandwiched between two bonding films each 0.024" thick.

I claim:

1. A method of producing a laminate slab comprising a plurality of cured asbestos-cement sheets facially joined together, the method comprising the steps of:
    (a) forming a stack of initially set but incompletely cured asbestos-cement sheets with at least one solid plastic bonding film sandwiched between two sheet surfaces to be joined,
    (b) arranging said stack within an autoclave vessel and subjecting the stack within the autoclave to stream under pressure sufficient to render the film fluid and simultaneously to complete curing of the asbestos-cement sheets, and
    (c) during curing within the autoclave vessel applying a compressive distributed loading to said stack imposed on it in the direction normal to said bonding film,
    thereby to form a laminate slab in which said sheets are completely cured and bonded together by said film.

2. A method according to claim 1 which includes the step of sandwiching a layer of pervious material other than asbestos-cement between said sheets.

3. A method according to claim 2 wherein two bonding films are sandwiched between two asbestos-cement sheet surfaces to be joined and a layer of material other than asbestos-cement is sandwiched between said two films.

4. A method according to any one of claims 1, 2, or 3 wherein said bonding film is one selected from the group consisting of polyethylene, polypropylene and polyvinyl chloride.

5. A method according to any one of claims 1, 2, or 3 wherein the period of autoclaving is from 6 to 12 hours under a saturated steam pressure of from 125 to 140 lbs per square inch.

6. A method according to any one of claims 1, 2, or 3 wherein the overall dimensions of said film are marginally greater than those of the surfaces to be joined together by that film.

7. A method according to any one of claims 1, 2, or 3 wherein the individual asbestos-cement sheets and the bonding film therebetween extend throughout the lateral dimensions of the laminated slab eventually constituted thereby.

8. A method according to claim 1 wherein said slab consists of a base sheet of asbestos-cement having a number of smaller asbestos-cement sheets joined to at least one face thereof.

9. A method according to claim 1 wherein each asbestos-cement sheet of a pair thereof joined together is joined to its companion sheet over a superficial area less than its total area in the plane of said superficial area.

10. A method according to claim 2 wherein the layer of pervious material other than asbestos-cement consists of wire-mesh material.

11. A method according to claim 2 wherein the layer of pervious material other than asbestos-cement is an array of reinforcement filaments.

12. A method according to claim 3 wherein the layer of material other than asbestos-cement is a metal foil.

* * * * *